Jan. 25, 1927.

A. J. BAKER 1,615,435

DIRIGIBLE HEADLIGHT

Filed Dec. 26, 1923

Inventor:
Andrew J. Baker.
By Fred H. Pharson
Attorney.

Patented Jan. 25, 1927.

1,615,435

UNITED STATES PATENT OFFICE.

ANDREW J. BAKER, OF ST. LOUIS, MISSOURI.

DIRIGIBLE HEADLIGHT.

Application filed December 26, 1923. Serial No. 682,624.

My invention relates to dirigible head lights, more particularly for motor vehicles, but not necessarily limited thereto, and, has for its object to provide means whereby the head lights will turn or move with the steering wheels in unison therewith, so as to direct the rays of light with the path of travel of the steering wheels in making turning movements to enable the driver to clearly see in the direction the driving wheels are directed.

A further object of the invention is the provision of a supporting lamp post having a tapered end to which is applied a steering arm connection.

A still further object of the invention is the provision of a detachable connection between the tie rod connecting the lamps and the steering connection between the tie rod connecting the steering wheels and steering wheel post.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views.

Figure 1:
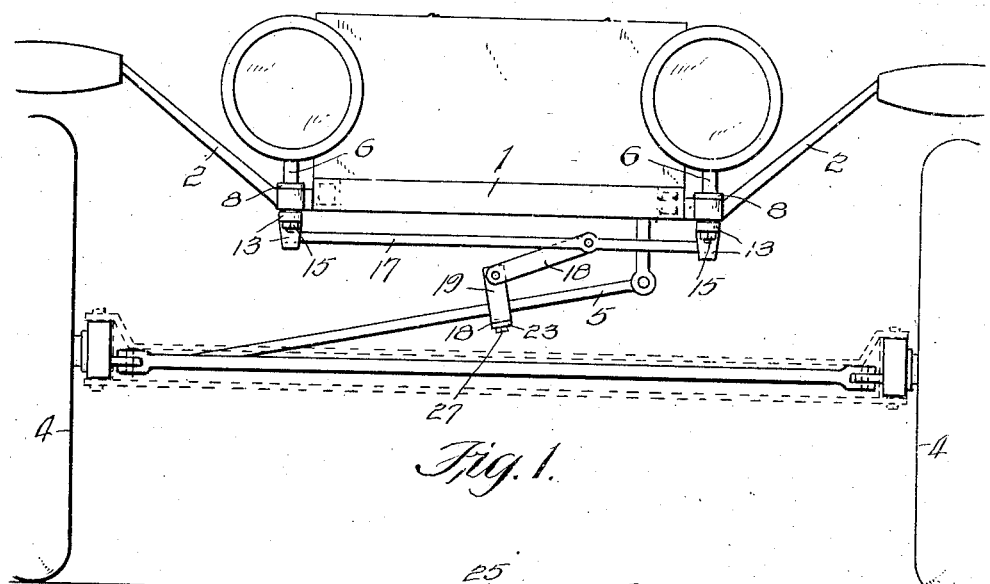
Fig. 1 is a front elevation of a "Ford" motor vehicle, showing my invention applied thereto.

Referring to the drawings, the reference character 1 represents the chassis frame. The reference numeral 2 represents the usual front fender brace of a "Ford" having the opening 3. The reference numeral 4 represents the steering wheels and the numeral 5 designates the steering rod for communicating movement to the steering wheels.

In carrying out the aim of my present invention, I employ a pair of suitable shafts or lamp supporting brackets 6. A suitable lamp 7 is fixed to the upper end of each shaft or supporting bracket 6. Each shaft 6 is provided near its lower end with a suitable flange or collar 8 adapted to rest upon or engage the upper face of the fender bracket 2 adjacent the opening 3 thereof. That section of each shaft 2 below the flange is designated 9 and is rotatably journaled in the openings 3 of the fender braces 2. Integral with the lower end of the journal section 9 of each shaft 6 is a tapered section 10 which is disposed below the lower faces of the fender brackets 2 and a shoulder 11 is formed at the juncture of the tapered sections 10 with the journaled sections 9. Extending from the lower or smaller end of each tapered section 10 is a screw threaded extension or neck 12. A suitable arm 13 having a tapered opening 14 at one end is adapted to be mounted upon the tapered section of each lamp supporting shaft or bracket 6 and is held from displacement by means of a nut 15 carried by the screw threaded extension 12 of each bracket 6. A suitable set screw 16 may also be employed, if desired, and which is carried by each of the arms 13 and the inner ends thereof adapted to engage the tapered section for firmly locking the arms upon the tapered sections in any adjusted position.

Figure 2:
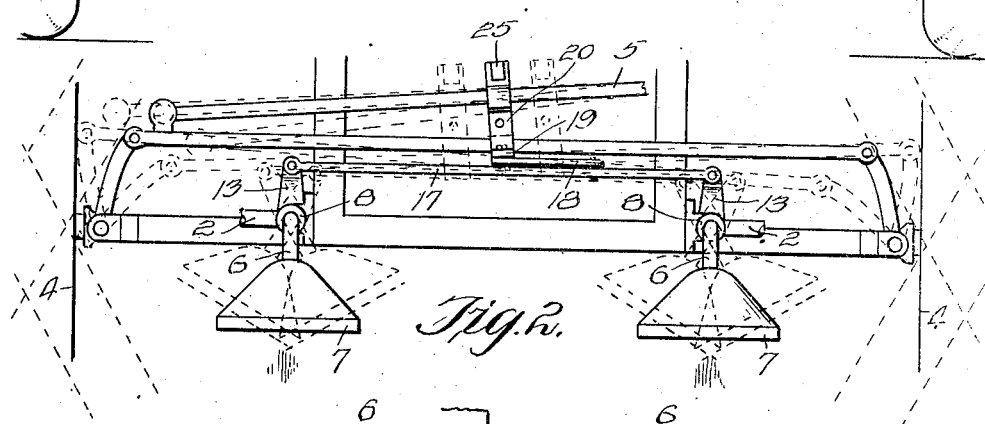
Fig. 2 is a top plan view thereof.

The arms 13 are directed rearwardly from the lamp supporting shafts or brackets 6 and the two opposed arms are united by means of a suitable tie rod connection 17, as clearly shown in Figs. 1 and 2.

Figures 3, 4, 5:
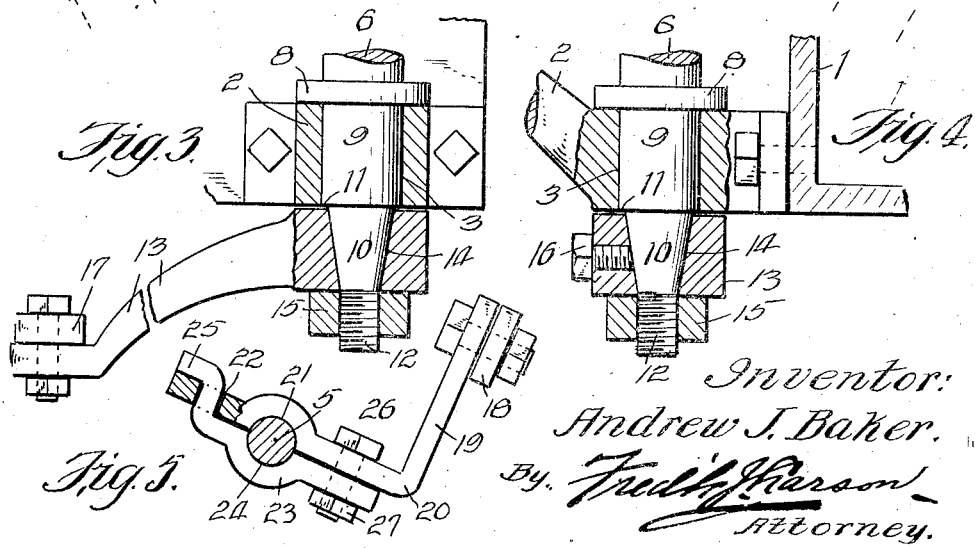
Fig. 3 is a detail of the lamp supporting shaft and the arm attached thereto.
Fig. 4 is a view similar to Fig. 3, looking from another direction.
Fig. 5 is a detail of the connection between the steering rod and lamp turning rod.

A suitable link 18 is pivotally connected at its upper end to the tie rod connection 17 and is also pivotally connected at its lower end to upwardly directed arm 19 of a clamp member 20. Clamp member 20 is recessed as at 21, to engage the upper half of the steering rod 5 and is provided near its rear end with an opening 22. A suitable clamp plate 23 is provided with a recessed section 24 for engaging the lower half of the steering rod 5, and the rear end of the clamp plate 23 is provided with a suitably hooked end 25 for engagement in the opening 22 of the clamp member 20 for supporting one end of the clamp plate in position with relation to the clamp member and steering rod. The opposite end of the clamp plate 23 is held in locked engagement with the clamp member by means of a suitable fastener, such for instance, as a bolt 26 and a nut 27. By this arrangement, the clamp is fixed to the steering rod 5 so as to prevent displacement of the clamp upon the steering rod, as is evident from Fig. 5 of the drawings.

From the foregoing description, it is evident that I provide a dirigible head light mechanism, which has all the advantages of simplicity, which is easily and quickly applied to a vehicle, inexpensive in manufacture and highly efficient for the purpose designed.

While I have illustrated the invention as applied to a "Ford" car, it is evident that it is equally applicable to any make of motor vehicle, to locomotives, water craft and air craft, by making suitable connection with the steering mechanism.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the form, shape and particular arrangement of parts without departing from the spirit of my invention, hence I reserve the right to make any such changes, or modifications as may fairly fall within the scope of the appended claim when fairly construed.

What I claim is:

In combination with a headlight and mud guard bracket having an opening therein, an L-shaped post fixed to and directed downwardly from said lamp and journaled in the opening of said bracket, a stop flange for said post engaging the upper face of the bracket, a tapered extension directed downwardly from the lower end of the lamp post, a lever arm having a tapered opening for receiving the tapered extension of the lamp post, a set screw for securing the lever arm to the tapered extension, a screw threaded extension directed downwardly from the tapered extension and a nut carried thereby for locked engagement with the lower face of the lever arm.

In testimony whereof, I have hereunto signed my name to the specification.

ANDREW J. BAKER.